United States Patent Office 3,322,511

Patented May 30, 1967

3,322,511

REARRANGEMENT OF CHLOROSILANES

Donald R. Weyenberg, Midland, Mich., assignor to Dow Corning Corporation, Midland, Mich., a corporation of Michigan No Drawing. Filed Oct. 4, 1962, Ser. No. 228,272
2 Claims. (Cl. 23—366)

This invention relates to a method for rearranging chlorosilanes.

Silicochloroform ($HSiCl_3$) is prepared by a well-known reaction comprising passing dry HCl through a mass of silicon mixed with copper at an elevated temperature (e.g. 300° C.). A similar reaction employing methyl chloride produces silicochloroform and methylhydrogendichlorosilane as by-products. It is frequently found that excessive supplies of silicochloroform and methylhydrogendichlorosilane are produced during the course of production of other more desirable silanes and there have been many attempts to convert the by-products to more desirable silanes.

It is apparent that one method for obtaining desired silanes from the by-produced $HSiCl_3$, $CH_3HSiCl_2$ and similar materials is to rearrange the molecules. Several rearrangement catalyst have been proposed for such a reaction and it is the object of this invention to introduce new and efficient rearrangement catalysts for the noted reaction. An economical rearrangement system for obtaining desired chlorosilanes from by-produced and less-valuable silanes is also an object of this invention. Other objects and advantages of this invention are detailed in or will be apparent from the disclosure and claims following.

This invention consists of a method of rearranging chlorosilanes of the formula $R_nHSiCl_{3-n}$ where R is a monovalent hydrocarbon radical free of aliphatic unsaturation containing less than seven carbon atoms and $n$ is 0 or 1 by contacting said chlorosilane with an amide selected from

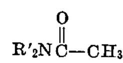

and $$R'_2N\overset{O}{\overset{\|}{C}}-CH_3$$

where R′ is a methyl or ethyl radical, or triphenylphosphine at a temperature of from 50° to 250° C.

The chlorosilane starting materials can be silicochloroform ($HSiCl_3$), organodichlorosilanes ($RHSiCl_2$) and mixtures thereof. The organic substituents represented by R are monovalent hydrocarbon radicals free of aliphatic unsaturation and containing 1–6 carbon atoms such as methyl, ethyl, propyl, butyl, pentyl, hexyl, cyclohexyl, cyclobutyl and phenyl radicals. These silanes are well known and can be produced by methods well known and well documented in the art.

The catalysts employed herein can be triphenylphosphine [$(C_6H_5)_3P$] and amides of the formulae $$R'_2N\overset{O}{\overset{\|}{C}}H$$

and

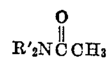

where R′ is $CH_3$ or $C_2H_5$. The operable amides include dimethylformamide, diethylformamide, dimethylacetamide (N,N) and diethylacetamide (N,N). The catalysts are known materials prepared by methods known in the art.

The catalysts are employed in catalytic quantities and the amount of catalyst is not critical. Acceptable yields are obtained with 0.1 to 10 parts by weight catalyst for 100 parts by weight of the chlorosilane starting material and the best results are achieved with 1 to 5 parts by weight catalyst on the stated basis.

The chlorosilane is brought in contact with the catalyst at a temperature exceeding 50° C. Temperatures below 50° C. are impractical because the rearrangement rate is far too slow. In general, temperatures above 250° C. are undesirable because decomposition of materials becomes a deleterious factor. Thus it is preferred to carry out the rearrangement at a temperature of 50° to 250° C.

The products of the rearrangement can be used for water repellent treatment of masonry, as intermediates in the preparation of more sophisticated silanes and siloxane polymers and as starting materials in the preparation of modified organic polymers such as the well known silicon alkyds.

The following examples illustrate the invention.

*Example 1*

A mixture of 1 cc. $HSiCl_3$ and .02 cc. dimethylformamide

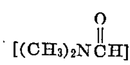

was sealed in a glass tube and heated for 16 hours at 100° C. The glass tube was then broken, the contents were removed and analyzed by gas-liquid phase chromatography techniques. The products obtained include 2.6 mol percent of $H_2SiCl_2$ which is approximately 25 percent of the theoretical yield of the desired $H_2SiCl_2$ in a closed system.

*Example 2*

Following the method of Example 1 mixtures of .5 cc. of $HSiCl_3$ with (a) 10.7 mg. of triphenylphosphine and (b) 14.3 mg. of triphenylphosphine were sealed in glass tubes and heated as follows: (a) at 100° C. for 15 hours; (b) at 200° C. for 15 hours. The products in the sealed tubes were determined by proton nuclear magnetic resonance spectrum (NMR) and in each case an approximately theoretical yield of $H_2SiCl_2$ was obtained as follows: (a) 5 mol percent of desired product; (b) 9 mol percent of desired product.

*Example 3*

A mixture of 0.75 cc. methyldichlorosilane

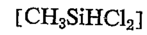

and .02 cc. dimethylacetamide (N,N) was sealed in a glass tube and heated at 200° C. for 18 hours. The products were analyzed by NMR and were found to include nearly theoretical yields of $CH_3SiH_2Cl$ and $CH_3SiCl_3$ which is also a desirable product.

*Example 4*

Mixtures of 0.5 cc. $CH_3SiHCl_2$ and (c) 10.2 mg. triphenylphosphine and (d) 14.8 mg. triphenylphosphine were sealed in glass tubes and heated for 18 hours at (c) 200° C. and (d) 100° C. Good yields of $CH_3SiH_2Cl$ and $CH_3SiCl_3$ were obtained from both mixtures.

*Example 5*

Equivalent results were achieved when the method of Example 4 was repeated employing equivalent amounts of

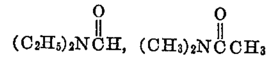

and

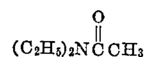

in place of the triphenylphosphine.

That which is claimed is:

1. A method for preparing silanes having two hydrogen atoms bonded to silicon consisting essentially of heating in the absence of silicon-bonded fluorine at a temperature of 50° to 250° C. at least one silane selected from the group consisting of $HSiCl_3$ and $RSiHCl_2$ where R is a monovalent hydrocarbon radical free of aliphatic unsaturation and containing 1 to 6 carbon atoms in contact with a catalyst consisting of amides of the formulae $$R'_2N\overset{\overset{\displaystyle O}{\|}}{C}H$$

and

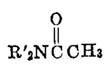

where R′ is a monovalent radical selected from methyl and ethyl radicals.

2. The method of claim 1 wherein the catalyst is

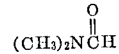

References Cited

UNITED STATES PATENTS

| | | | |
|---|---|---|---|
| 2,834,648 | 5/1958 | Bailey et al. | 23—14 |
| 3,057,902 | 10/1962 | Pike | 23—366 X |
| 3,128,297 | 4/1964 | Kanner et al. | 260—448.2 |

OSCAR R. VERTIZ, *Primary Examiner.*

EARL C. THOMAS, *Examiner.*